United States Patent [19]

Collins

[11] Patent Number: 4,536,271

[45] Date of Patent: Aug. 20, 1985

[54] METHOD OF PLASMA TREATING A POLYMER FILM TO CHANGE ITS PROPERTIES

[75] Inventor: Gregory P. Collins, Fairport, N.Y.

[73] Assignee: Mobil Oil Corporation, New York, N.Y.

[21] Appl. No.: 566,724

[22] Filed: Dec. 29, 1983

[51] Int. Cl.³ ............................................. C23C 15/00
[52] U.S. Cl. ................................. 204/192 E; 204/165; 204/168; 156/345; 156/643
[58] Field of Search ................... 204/165, 168, 192 E; 156/643, 345

[56] References Cited

U.S. PATENT DOCUMENTS

| | | | |
|---|---|---|---|
| 2,935,418 | 5/1960 | Berthold | 204/168 |
| 3,415,986 | 12/1968 | Shepard | 204/165 |
| 3,654,108 | 4/1972 | Smith, Jr. . | |
| 3,661,735 | 5/1972 | Drelich . | |
| 3,705,055 | 12/1972 | Christensen et al. . | |
| 3,829,324 | 8/1974 | Blais et al. | 204/165 |
| 4,013,532 | 3/1977 | Cormia et al. | 204/165 |
| 4,072,769 | 2/1978 | Lidel . | |
| 4,155,826 | 5/1979 | Nakai et al. . | |
| 4,188,273 | 2/1980 | Sano et al. . | |
| 4,212,719 | 7/1980 | Osada et al. | 204/168 |
| 4,216,254 | 8/1980 | Lundell et al. | 204/168 |
| 4,297,187 | 10/1981 | Deguchi et al. . | |
| 4,331,526 | 5/1982 | Kuehnle . | |
| 4,338,420 | 7/1982 | Arbit . | |
| 4,357,203 | 11/1982 | Zelez | 204/192 E |
| 4,452,679 | 6/1984 | Dunn et al. | 204/168 |
| 4,455,207 | 6/1984 | Sartor et al. | 204/192 E |

OTHER PUBLICATIONS

Hojou et al., Chem. Abstracts 94(1981), #104081.
von der Heide et al., Plastics Engineering, May 1961, pp. 199–205.
Yasuda, Thin Film Process; Academic Press, N.Y., N.Y., 1978, pp. 361–368.

Primary Examiner—Arthur P. Demers
Attorney, Agent, or Firm—Alexander J. McKillop; Michael G. Gilman; Charles J. Speciale

[57] ABSTRACT

A method of treating a polymer film to alter its physical properties, comprising exposing the film to an ionized plasma in a vacuum environment with the ionizing gas producing one of surface etching, polymer cross-linking and coating of the film.

16 Claims, 3 Drawing Figures

METHOD OF PLASMA TREATING A POLYMER FILM TO CHANGE ITS PROPERTIES

BACKGROUND OF THE INVENTION

1. Field of the Invention

The present invention is related to a method of treating a polymer film with a low temperature, e.g., 50°-120° Celsius, plasma to improve its physical properties, such as tensile strength.

2. Discussion of the Prior Art

Plastics films have attained a considerable degree of commercial success and are used in a wide variety of products. One such use is in the formation of bags where the film is subjected to considerable forces when in use. One film strength characteristic which is important, particularly in bag manufacture, is tensile strength. However, it has been found that tensile strength of a film can be adversely affected by the presence of low molecular weight polymer species which migrate to the film surface during melt crystallization of the polymer forming the film. These short chain molecules have fewer polymer entanglements than the underlying bulk material and therefore film failure is more easily initiated at a lower stress level than would be the case with the underlying film bulk material. A film failure initiated in the surface layer easily propagates into the underlying bulk material. In addition, the extrusion of molten polymer into a high flow of cooling air, such as occurs in blown film extrusion, causes surface embrittlement through oxidation. A brittle polymer surface coating on a more ductile substrate also reduces physical properties of a film, e.g., tensile strength, by increasing the ease of fracture initiation.

Several techniques, such as molecular orientation, uniaxial and biaxial stretching, etc. have been used to increase physical properties of a film. In general, however, these strength increasing techniques do not address the inherent weakness problems caused by a surface layer of a film which is more easily fractured than an underlying bulk material layer.

SUMMARY OF THE INVENTION

One general object of the invention is the provision of a method of treating a polymer film with a plasma environment to alter its physical properties.

Another, more specific, object of the present invention is the provision of a method of treating a polymer film with a plasma environment to alter its physical properties by removing weak or brittle surface layers thereof and increasing its inherent tensile strength.

These objects are obtained in a method which comprises the steps of transporting a polymer film into a vacuum treatment chamber filled with a low concentration treatment gas, e.g., $1 \times 10^{-5}$ to $4 \times 10^{-5}$ gram moles per liter, at an absolute pressure of 0.2–0.7 Torr, ionizing the treatment gas to create a reactive medium to which the film is exposed, exposing the film to the reactive medium for a predetermined period of time and thereafter removing the film from the treatment chamber. The method can be carried out on a continuous or discontinuous basis, and sequential treatments with different treatment gases can be done. The plasma gas can be an inorganic compound, e.g., $O_2$, $N_2$, AR, or organic compounds, e.g., silanes, saturated and unsaturated hydrocarbons, and aromatics. Modification of the film properties occurs by etching, cross-linking or coating of the film surface, depending on the treatment gas employed. To improve the tensile properties of the film, an $O_2$ treatment gas, which etches away a film surface layer, is preferred.

The method of the invention provides distinct property improvements with little or no material consumption. In addition, with etching, film downgauging can be achieved, while improving physical properties such as tensile strength.

The method of the invention and its advantages and features will be more clearly understood from the following detailed description, which is provided in connection with the accompanying drawings.

DETAILED DESCRIPTION OF THE INVENTION

Figure 1:
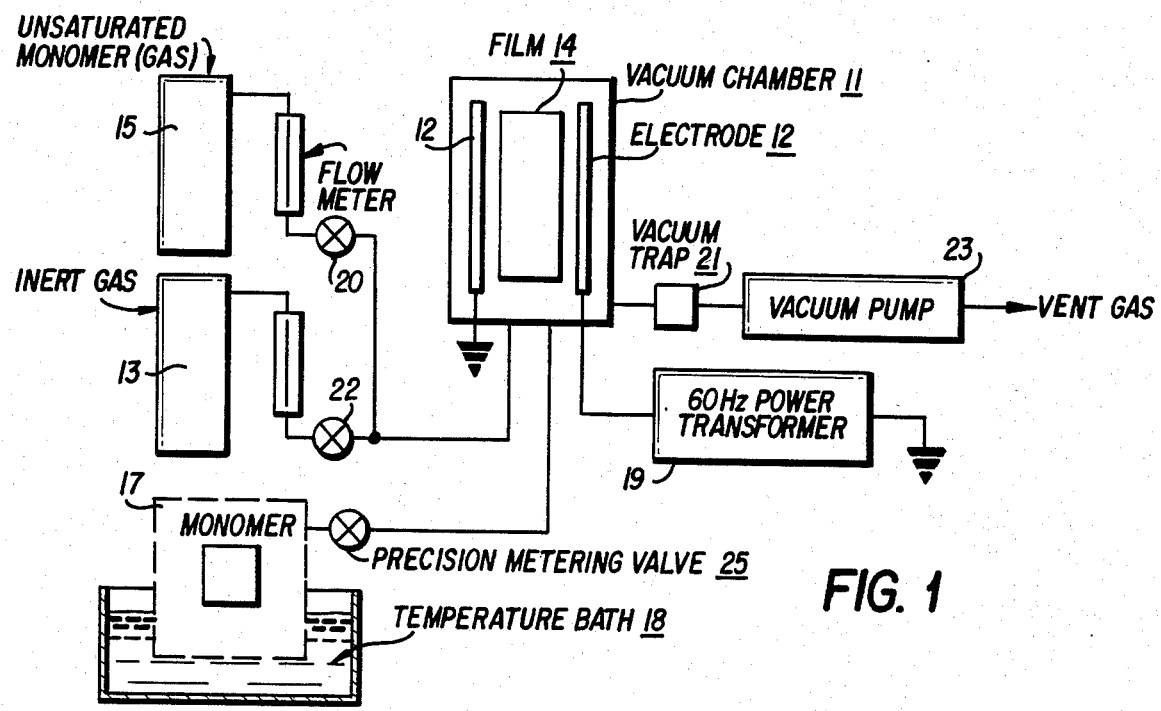
FIG. 1 is a schematic diagram of an apparatus used to carry out the method of the invention.

FIG. 1 illustrates an apparatus which is used to practice the method of the invention. A vacuum treatment chamber 11 contains electrodes 12 which are spaced by a fixed distance, e.g., 18". A film 14 to be treated is disposed between the electrodes. The treatment chamber is connected to a vacuum pump 23 through a vacuum trap 21. Vacuum trap 21 is a well known device which functions to collect condensible gases as a liquid, removing them from the treatment chamber 11 exit stream. Vacuum pump 23 is used to evacuate the treatment chamber. One of the electrodes 12 is grounded, while the other is connected to one output of a power transformer 19, the other output of which is also grounded.

Before film treatment the vacuum chamber 11 is purged one or more times with a treatment gas. The treatment gas originates from one of a plurality of selectable sources, for example, an inert gas source 13, and an unsaturated monomer gas source 15 by means of respective selection valves 20, 22 and flow meters. Another source of a monomer treatment gas 17, which is also selectable, is also provided and connected to the treatment chamber through a precision metering valve 25. Source 17 provides a monomer gas vapor from a liquid material, e.g., from a flask containing 100–150 ml of liquid, with the vapor pressure thereof being controlled by the temperature of a temperature bath 18 which surrounds the flask. Opening one of valves 20, 22 or 25 controls the application of a selected treatment gas to the vacuum chamber 11. Alternatively, a selected gas mixture formed by gases from two or more of the sources, 13, 15 and 17 can be obtained by appropriate operation of valves 20, 22 and 25.

Figure 2:
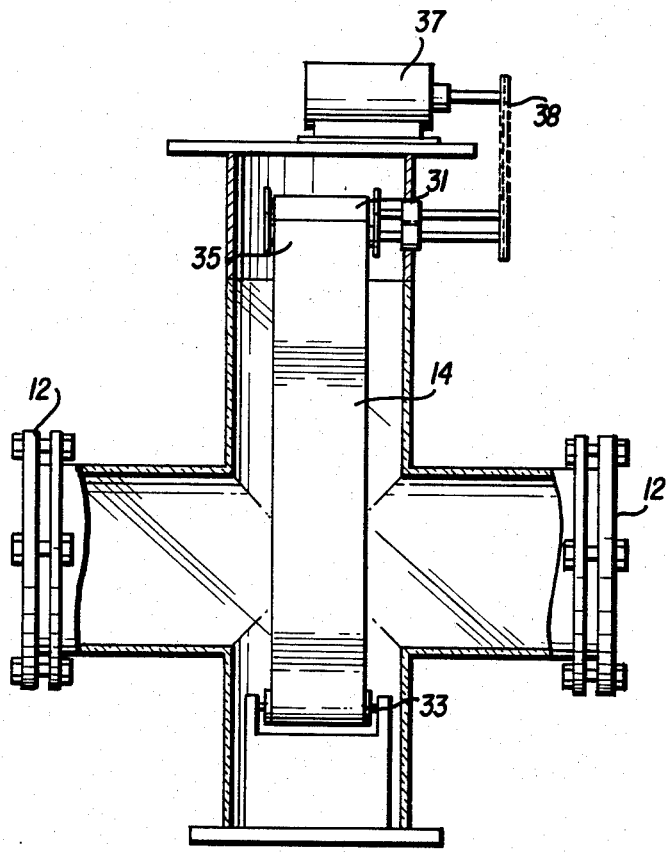
FIG. 2 is a front cross-sectional view of a treatment chamber used in the method of the invention.
Figure 3:
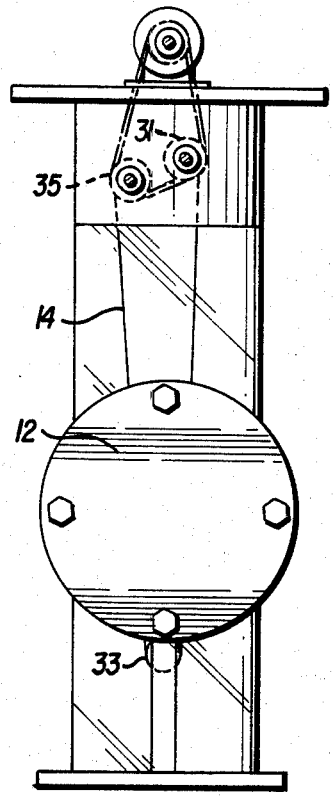
FIG. 3 is a side view of the treatment chamber.

The treatment chamber 11 is illustrated in greater detail in FIGS. 2 and 3. A film 14 to be treated is unwound from a supply roll 31, passes over a guide roll 33 and is wound on a take-up roll 35. The film passes between the electrodes 12 in passing from the supply 31 to take-up rolls 35. The film can be driven through chamber 11 either continuously or intermittently by a motor 37 which is connected to the supply and take-up rolls 31, 35 by a driving assembly 38.

For film surface treatment, the treatment chamber 11 is initially purged 2 or 3 times, with the selected treatment gas by selectively opening one of the valves 20, 22, 25 and thereafter evacuating the chamber. The treatment gas then fills the chamber under 0.2–0.7 Torr absolute pressure. The treatment gas within the chamber is at a relatively low concentration in the range of $1 \times 10^{-5}$ to $4 \times 10^{-5}$ gram moles per liter. The power supplied by transformer 19 is then increased at the given gas pressure to cause an electrical discharge. Typically, the required power will range from 10 to several hundred watts. The resulting ionized gas becomes the reactive medium. By varying the drive speed of film 14 through the treatment chamber 11, the exposure time of the film to the plasma can be varied from a few seconds to several minutes, thus providing a convenient means for varying the treatment level. Thermal degradation of the polymeric film is prevented because the plasma reaction is carried out at low temperature, e.g., about 50°–120° Celsius, due to the reduced gas pressure (0.2 to 0.7 Torr) and the use of a low concentration ($1 \times 10^{-5}$ to $4 \times 10^{-5}$ gram moles per liter) of ionized gas.

The plasma gas can be inorganic or organic compounds. As examples of inorganic gas compounds, oxygen, nitrogen, helium, neon and argon can be used. Exemplary organic compounds include silanes, saturated and unsaturated hydrocarbons and aromatics.

The ionized gas causes modifications to occur at the film 14 surface by etching, cross-linking, or film coating, depending on the treatment gas which is used. For example, to improve the tensile properties of the film, an oxygen gas atmosphere is preferred, which results in an etching away of outer layers of the film. Typically, etching occurs to a depth of less than 1 micron. With $O_2$ etching, low molecular weight polymer species which have migrated to the film surface during melt crystallization are removed, thereby increasing the stress level required to initiate film fracture. Brittle layers caused by surface oxidation, which occur during blown film extrusion, are also removed. If an ethylene gas is used as the treatment gas, surface polymerization of the film occurs, with the film then being coated with a polyethylene layer. Thus, it is possible to first use an oxygen gas plasma treatment to remove brittle surface layers from a film and then use an ethylene plasma treatment to produce a new polyethylene surface layer.

Various plastics films can be treated using the method of the invention, exemplary films being linear low density polyethylene, low density polyethylene, high density polyethylene, high molecular weight high density polyethylene, polypropylene, polystyrene and others. It is also possible to plasma treat non-plastic films and other articles. For example, an ethylene treatment gas can be used to form a polyethylene coating on paper and wood products.

While oxygen gas ($O_2$) has been found to provide a surface etching phenomena, the use of argon gas (Ar) has been found to induce cross-linking of the surface polymer. The cross-linking phenomenon has been observed with various other inert gases, such as helium and neon. Organic monomers, when used as the treatment gas, provide surface coatings on the polymer film. Coatings may be applied in the manner described above by first activating the film surface by the use of an organic or inorganic plasma, e.g., oxygen gas, after which the surface is contacted with the reactive monomer gas as the treatment gas. It is also possible to first employ an ionized gas (plasma) treatment and then expose the film to a non-ionized treatment gas.

Table I illustrates experiments performed on seven polymer film samples using argon and oxygen as the first treatment gases and, in some instances, with hexane and ethylene used as subsequent treatment gases for film coating, while Table II illustrates the changes in physical properties which were observed. In Table I, coating treatment with a non-ionized gas is illustrated by the symbol (—) under the voltage, current and power columns.

TABLE I

Experimental Conditions During Plasma (Conditions During Coating)

| Example | Film[1] | Plasma Gas | Gas Pressure MilliTorr | Voltage Volts | Current MilliAmps | Power Watts | Exposure Time Seconds |
|---|---|---|---|---|---|---|---|
| 1 | LLDPE | Argon | 1000 | 300 | 100 | 30 | 20 |
|   |       | (Hexane) | (Conditions Not Recorded) | | | | 20 |
| 2 | LLDPE | Argon | 600 | 500 | 120 | 60 | 15 |
|   |       | (Ethylene) | (6200) | (—) | (—) | (—) | (15) |
| 3 | LLDPE | Argon | 610 | 440 | 120 | 53 | 72 |
| 4 | LLDPE | Argon | 650 | 430 | 122 | 52 | 5 |
| 5 | LLDPE | Oxygen | 590 | 700 | 70 | 49 | 72 |
| 6 | LLDPE | Oxygen | 600 | 600 | 80 | 48 | 72 |
|   |       | (Ethylene) | (7000) | (—) | (—) | (—) | (72) |
| 7 | HDPE  | Argon | 620 | 500 | 142 | 71 | 26 |

[1]Resins Used - LLDPE - Dow 2045/HDPE - DuPont 7810

TABLE II

Effect of Plasma Surface Treatments of Physical Properties of Thin Films (Untreated Control)

| Ex. | Film | Plasma Gas | Coating Gas | Yield psi | Ultimate psi | Elong % | Toughness Ft-Lb/In$^3$ | Elmendorf Tear Gram | Puncture Resistance Lb |
|---|---|---|---|---|---|---|---|---|---|
| 1 | LLDPE | Argon | Hexane | 1965 (1763) | 4430 (3529) | 560 (514) | 1200 (962) | 129 (132) | — |
| 2 | LLDPE | Argon | Ethylene | 1883 (1801) | 4491 (3772) | 585 (540) | — | — | — |
| 3 | LLDPE | Argon | — | 1770 (1793) | 3652 (3529) | 528 (514) | 1013 (962) | 128 (132) | — |
| 4 | LLDPE | Argon | — | 1752 (1793) | 3718 (3529) | 537 (514) | 1029 (962) | 127 (132) | — |

TABLE II-continued
Effect of Plasma Surface Treatments of Physical Properties of Thin Films (Untreated Control)

| Ex. | Film | Plasma Gas | Coating Gas | Yield psi | Ultimate psi | Elong % | Toughness Ft-Lb/In³ | Elmendorf Tear Gram | Puncture Resistance Lb |
|---|---|---|---|---|---|---|---|---|---|
| 5 | LLDPE | Oxygen | — | 1742 (1793) | 4047 (3529) | 565 (514) | 1165 (962) | 132 (132) | — |
| 6 | LLDPE | Oxygen | Ethylene | 1733 (1793) | 4426 (3529) | 641 (514) | 1305 (962) | 123 (132) | |
| 7 | HDPE | Argon | — | 2967 (3031) | 6434 (6666) | 452 (459) | 1475 (1534) | 14.1 (14.5) | 1.62 (1.28) |

As shown in the tables above, the cross-linking produced with an argon gas treatment alone (examples 3, 4 and 7) produced minor changes in the tensile and tear properties of the films; however, the use of oxygen along or with subsequent organic coating (examples 5,6) produced a significant increase in tensile strength without changing elongation or tear properties. Sample 7 illustrates that although tensile strength remains constant after argon treatment (cross-linking), puncture resistance increased significantly (30%).

While preferred embodiments of the method of the invention have been described above, many modifications can be made thereto without departing from its spirit and scope. Accordingly, the invention is not limited by the foregoing description, but is only limited by the scope of the appended claims.

I claim:

1. A method of strengthening a polymer film comprising the steps of:
    placing said film in a vacuum chamber containing a pair of electrodes;
    filling said chamber with a treatment gas under a pressure of 0.2–0.7 Torr;
    applying a voltage to said electrodes to initiate a discharge in and ionization of said treatment gas; and
    exposing said film to said ionized treatment gas for a predetermined period of time and thereby etching away a surface layer of said film.

2. A method as in claim 1, wherein said treatment gas is an inorganic compound.

3. A method as in claim 2, wherein said treatment gas is selected from the group consisting of oxygen, nitrogen, neon, helium and argon.

4. A method as in claim 1, wherein said treatment gas is an organic compound.

5. A method as in claim 4, wherein said treatment gas is selected from the group consisting of silanes, saturated and unsaturated hydrocarbons and aromatics.

6. A method as in claim 1, wherein said film is first exposed to said ionized treatment gas and is thereafter exposed to another ionized treatment gas.

7. A method as in claim 1, wherein said etching is to a depth of less than 1 micron.

8. A method as in claim 1, wherein said film is selected from the group consisting of linear low density polyethylene, low density polyethylene, high density polyethylene, high molecular weight high density polyethylene, polypropylene and polystyrene.

9. A method as in claim 1, wherein said treatment gas is in a concentration of $1 \times 10^{-5}$ to $4 \times 10^{-5}$ gram moles per liter in said chamber.

10. A method as in claim 1, wherein the temperature of said ionized treatment gas is in a range of 50°–120° Celsius.

11. A method as in claim 1, wherein said treatment gas in an inert gas.

12. A method as in claim 5, wherein said treatment gas is an ethylene gas.

13. A method as in claim 1, further comprising the step of removing said treatment gas from said chamber, introducing a different treatment gas into said chamber and applying a voltage to said electrodes to initiate a discharge and an ionization of said different treatment gas.

14. A method as in claim 13, wherein said treatment gas is oxygen and said different treatment gas is an ethylene gas.

15. A method as in claim 1, further comprising the steps of removing said treatment gas from said chamber and introducing a different treatment gas into said chamber which is not ionized.

16. A method as in claim 15, wherein said treatment gas is oxygen and said different treatment gas is an ethylene gas.

* * * * *